US011973264B2

(12) United States Patent
Takenaka et al.

(10) Patent No.: US 11,973,264 B2
(45) Date of Patent: Apr. 30, 2024

(54) ANTENNA MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Yuji Takenaka, Mie (JP); Norichika Oomi, Mie (JP); Kosuke Sone, Mie (JP); Suguru Yamagishi, Osaka (JP); Takanori Fukunaga, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 225 days.

(21) Appl. No.: 17/624,981

(22) PCT Filed: Jun. 25, 2020

(86) PCT No.: PCT/JP2020/024989
§ 371 (c)(1),
(2) Date: Jan. 5, 2022

(87) PCT Pub. No.: WO2021/010125
PCT Pub. Date: Jan. 21, 2021

(65) Prior Publication Data

US 2022/0285829 A1 Sep. 8, 2022

(30) Foreign Application Priority Data

Jul. 12, 2019 (JP) ................................ 2019-129833

(51) Int. Cl.
*H01Q 1/32* (2006.01)
*H01Q 1/22* (2006.01)
*H01Q 21/30* (2006.01)

(52) U.S. Cl.
CPC ................. *H01Q 1/32* (2013.01); *H01Q 1/22* (2013.01); *H01Q 21/30* (2013.01)

(58) Field of Classification Search
CPC ........... H01Q 1/32; H01Q 1/22; H01Q 21/30; H01Q 1/241; H01Q 1/3233; H01Q 1/38; H01Q 5/50; H01Q 1/3275; H01Q 1/12
See application file for complete search history.

(56) References Cited

U.S. PATENT DOCUMENTS 8,201,773 B1 6/2012 Durham et al.
2003/0080908 A1* 5/2003 Mizutani ................ H01Q 13/10 343/711

(Continued)

FOREIGN PATENT DOCUMENTS

JP 06-291544 10/1994
JP 2008-085386 4/2008
JP 2012-232679 11/2012

OTHER PUBLICATIONS

Japan Office Action issued in Japan Patent Application No. 2021-532751, dated Feb. 7, 2023, together with English translation thereof.

(Continued)

*Primary Examiner* — Seung H Lee
(74) *Attorney, Agent, or Firm* — GREENBLUM & BERNSTEIN, P.L.C.

(57) ABSTRACT

An antenna module is an antenna module attached to a roof in a vehicle and includes a substrate and a plurality of antennas provided on the substrate, wherein the substrate is kept in a curved state.

10 Claims, 3 Drawing Sheets

(56) References Cited

U.S. PATENT DOCUMENTS

| | | | | |
|---|---|---|---|---|
| 2003/0117328 | A1* | 6/2003 | Sievenpiper | H01Q 1/3275 343/713 |
| 2006/0061145 | A1* | 3/2006 | Strebe | B62D 25/06 296/214 |
| 2007/0171137 | A1 | 7/2007 | Mierzwa et al. | |

OTHER PUBLICATIONS

Kilian et al., "Conformal Superstrate Loaded Automotive Radar Antenna for Integration in Polymer Car Body Panels", Proceedings of the Fourth European Conference on Antennas and Propagation, Apr. 2010, pp. 1-5.

Artner et al., "Automotive Antenna Roof for Cooperative Connected Driving", IEEE Access, vol. 7, Feb. 2019, pp. 20083-20090.

International Search Report issued in International Patent Application No. PCT/JP2020/024989, dated Sep. 24, 2020, along with an English translation thereof.

International Preliminary Report on Patentability issued in International Patent Application No. PCT/JP2020/024989, dated Jul. 7, 2021, along with an English translation thereof.

* cited by examiner

ANTENNA MODULE

TECHNICAL FIELD

The present disclosure relates to an antenna module.

BACKGROUND ART

Patent Document 1 discloses an attachment structure of an in-vehicle antenna. In the attachment structure of the in-vehicle antenna described in Patent Document 1, an antenna unit is disposed to protrude to an outer surface of a vehicle body.

PRIOR ART DOCUMENTS

Patent Documents

Patent Document 1: Japanese Patent Application Laid-Open No. 2008-85386

SUMMARY

Problem to be Solved by the Invention

Desired is decrease in a protrusion dimension of the antenna unit protruding to the outer surface of the vehicle body. When the protrusion dimension of the antenna unit protruding to the outer surface of the vehicle body decreases, a living space in a vehicle may decrease.

An object is to provide a technique capable of reducing a protrusion dimension of an antenna module protruding to an outer surface of a vehicle body and suppressing reduction in a living space in a vehicle.

Means to Solve the Problem

An antenna module according to the present disclosure is an antenna module attached to a roof in a vehicle including: a substrate; and a plurality of antennas provided on the substrate, wherein the substrate is kept in a curved state.

Effects of the Invention

According to the present disclosure, reduction in a protrusion dimension of an antenna module protruding to an outer surface of a vehicle body and suppression of reduction in a living space in a vehicle can be achieved.

DESCRIPTION OF EMBODIMENT(S)

Description of Embodiment of Present Disclosure

Embodiments of the present disclosure are listed and described firstly.

An antenna module according to the present disclosure is as follows.

(1) An antenna module attached to a roof in a vehicle includes: a substrate; and a plurality of antennas provided on the substrate, wherein the substrate is kept in a curved state. The antenna module in which the substrate is kept in the curved state is attached to the roof, thus a protrusion dimension of the antenna module protruding to an outer surface of a vehicle body can be reduced, and decrease in a living space in the vehicle caused by the antenna module can be suppressed.

(2) The substrate may be curved so that an outward surface is a convex surface. Accordingly, decrease in a living space in the vehicle can be suppressed.

(3) It is applicable that the plurality of antennas include a first antenna for first radio wave and a second antenna for second radio wave having a higher frequency band than the first radio wave, the first antenna and the second antenna are provided on the convex surface, and the second antenna is provided in a position in the substrate closer to a top part of the convex surface than the first antenna. Generally, radio wave is less diffracted as a frequency increases. Even in this case, the second antenna is provided in the position in the substrate closer to the top part of the convex surface than the first antenna, thus the second antenna can transmit and receive the second radio wave easily.

(4) It is also applicable that the antenna module further includes a support member supporting the substrate, wherein the support member is formed into a curved shape, the substrate is a flexible substrate and supported by the support member, thereby being kept in the curved state. Accordingly, the substrate can be kept in the curved state easily.

Details of Embodiment of Present Disclosure

Specific examples of an antenna module of the present disclosure are described hereinafter with reference to the drawings. The present invention is not limited to these examples, but is indicated by claims, and it is intended that meanings equivalent to claims and all modifications within a scope of claims are included.

Embodiment

Figure 1:
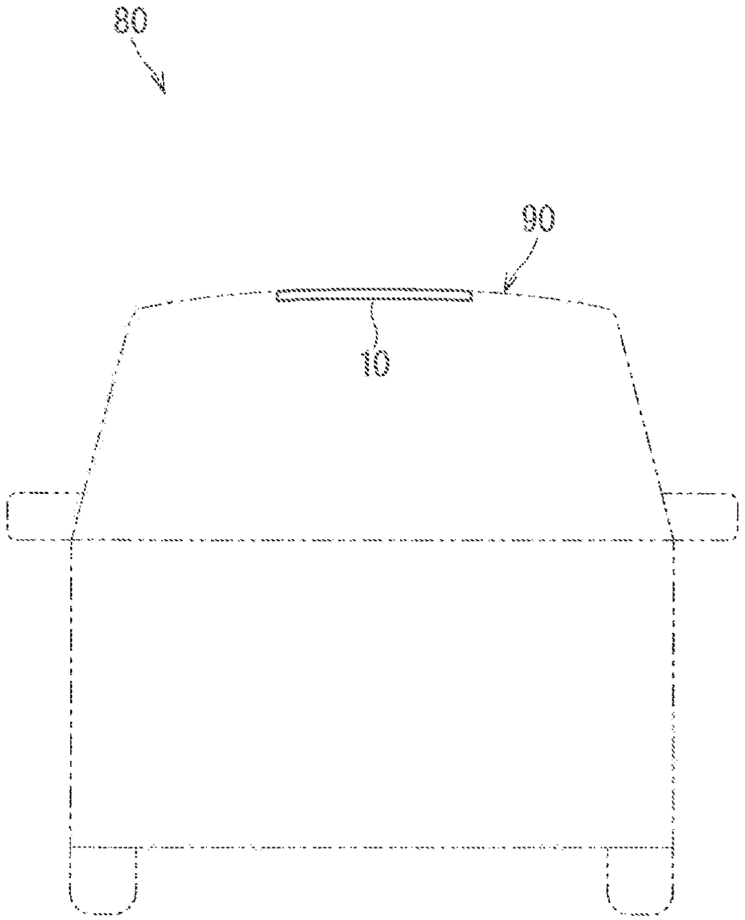
FIG. 1 is a schematic front view illustrating a vehicle to which an antenna module according to an embodiment is attached.
Figure 2:
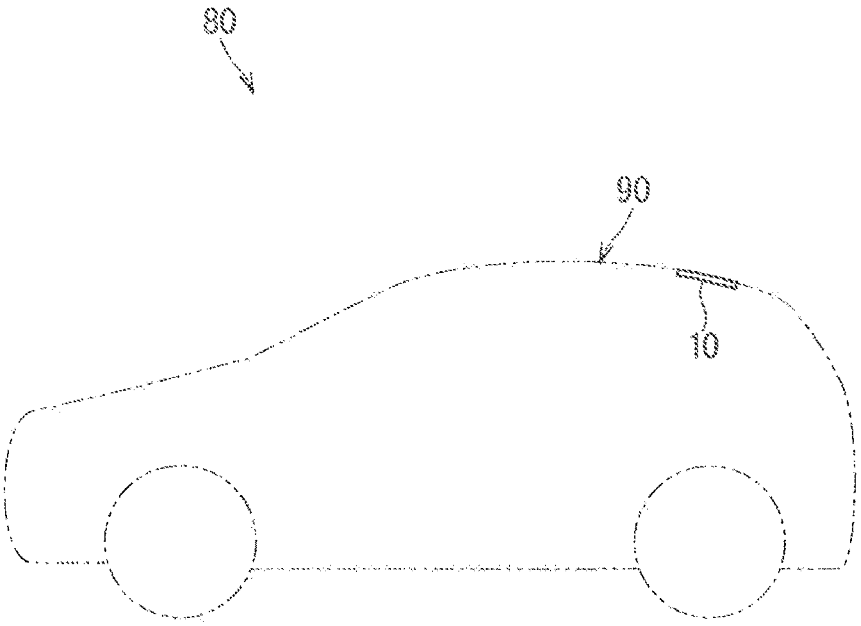
FIG. 2 is a schematic side view illustrating the vehicle to which the antenna module according to the embodiment is attached.
Figure 3:
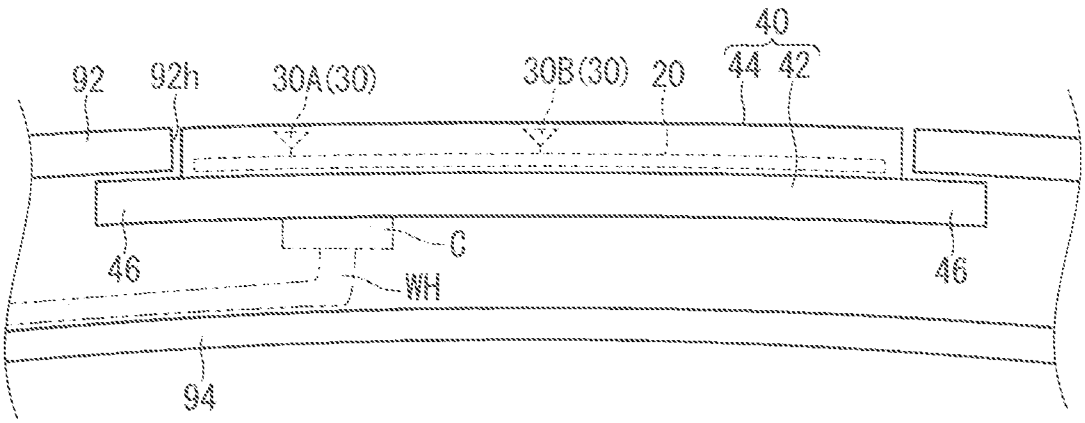
FIG. 3 is a schematic front view illustrating the antenna module according to the embodiment and an attachment structure of attaching the antenna module to a roof.
Figure 4:
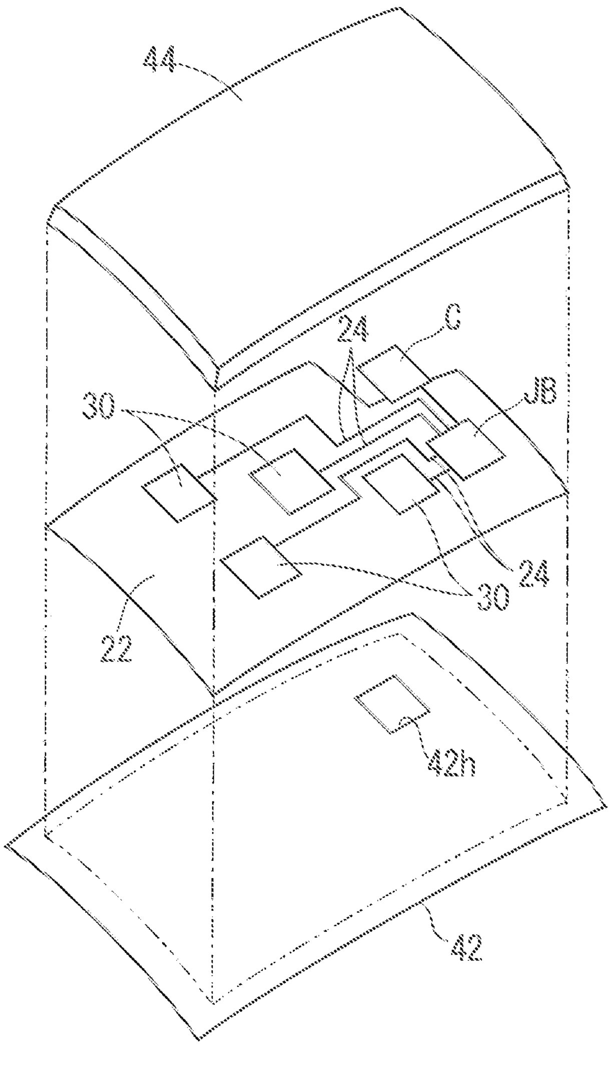
FIG. 4 is an exploded perspective view illustrating the antenna module according to the embodiment.

An antenna module according to an embodiment is described hereinafter. FIG. 1 is a schematic front view illustrating a vehicle 80 to which an antenna module 10 according to the embodiment is attached. FIG. 2 is a schematic side view illustrating the vehicle 80 to which the antenna module 10 according to the embodiment is attached. FIG. 3 is a schematic front view illustrating the antenna module 10 according to the embodiment and an attachment structure of attaching the antenna module 10 to a roof 90. FIG. 4 is an exploded perspective view illustrating the antenna module 10 according to the embodiment.

The antenna module 10 is attached to the roof 90 in the vehicle 80. Described firstly is a shape of the roof 90 to which the antenna module 10 is attached.

<Roof>

The roof 90 includes a roof panel 92 and a roof trim 94. The roof panel 92 is a member constituting an exterior appearance shape of the vehicle 80. The roof panel 92 is formed into a plate-like shape by metal or resin as a material. In the description herein, the roof panel 92 is curved. A through hole 92*h* is formed in the roof panel 92. The antenna module 10 is fitted to be attached to the through hole 92*h*. Accordingly, the antenna module 10 is exposed to an outer side. Needless to say, the configuration of the antenna module 10 fitted to the through hole 92*h* of the roof panel 92 is not necessary. The antenna module 10 may be disposed on a side of an outer surface of the roof panel 92. When the roof panel 92 is a member which does not shield radio wave, the antenna module 10 may be disposed on a side of an inner surface of the roof panel 92.

The antenna module 10 is attached to a curved part of the roof panel 92. That is to say, the through hole 92*h* is formed in the curved part of the roof panel 92. As illustrated in FIG. 1, a part of the roof panel 92 extending in a width direction of the vehicle 80 (simply referred to as the width direction hereinafter) may be curved. As illustrated in FIG. 2, a part of the roof panel 92 extending in a front-back direction of the vehicle 80 (simply referred to as the front-back direction hereinafter) may be curved. In a part of the roof panel 92 to which the antenna module 10 is attached, both the part extending in the width direction and the part extending in the front-back direction may be curved, only the part extending in the width direction may be curved, or only the part extending in the front-back direction may be curved.

The roof trim 94 is a member constituting an interior appearance of the vehicle 80. The roof trim 94 is also referred to as a roof liner or a molded ceiling. The roof trim 94 is formed into a plate-like shape by a material such as resin. The antenna module 10 is disposed on an outer side of the roof trim 94.

<Antenna Module>

The antenna module 10 includes a substrate 20 and a plurality of antennas 30. The antenna module 10 further includes a case 40 herein.

The substrate 20 is a printed circuit substrate 20. The substrate 20 includes an insulation body 22 and a print wiring 24. In the description hereinafter, the substrate 20 is the flexible substrate 20.

The insulation body 22 includes a base on which the print wiring 24 is printed. The insulation body 22 may include a solder resist, for example. The base is formed by a resin material such as fluorine resin. The fluorine resin is not particularly limited, however, polytetrafluoroethylene (PTFE) can be used, for example.

The print wiring, 24 is formed on the base. The print wiring 24 is formed by a copper foil, for example.

The plurality of antennas 30 are provided on the substrate 20. Each antenna 30 may be a printed component or a mounted component. When the antenna 30 is a printed component, for example, the antenna 30 may be provided integrally with the print wiring 24, for example. When the antenna 30 is the mounted component, a terminal of the antenna 30 is connected to the print wiring 24 by soldering, for example. The antenna 30 is a communication antenna on a side of the vehicle 80 when a wireless communication is performed between the vehicle 80 and an external communication component. A component corresponding to a wireless communication system is adopted to each antenna 30. The wireless communication system is not particularly limited. An intelligent transport system (ITS), a global positioning system (GPS), a mobile phone, an automobile phone, and a fifth generation mobile communication system (a so-called 5G) may also be applicable. Each antenna 30 correspond to a wireless communication system different from each other. Thus, the antenna module 10 corresponds to a plurality of wireless communication systems.

A frequency band to which each antenna 30 corresponds depends on each wireless communication system. For example, in the ITS, 700 MHz band and 5.8 GHz band are used. For example, in the GPS, L1 band (1575.42 MHz) and L2 band (1227.60 MHz) are used. For example, in the mobile phone and the automobile phone, 800 MHz band and 1.5 GHz are used. For example, in 5G, FR1 band (frequency range 1) equal to or smaller than 6 GHz band and FR2 band (frequency range 2) equal to or smaller than 24 GHz band can be used.

Each antenna 30 is connected to a junction box JB by the print wiring 24. The junction box JB performs a power source distribution, for example. A circuit necessary for wireless communication such as a signal converter, an oscillator, an amplifier, and a filter is appropriately mounted on the substrate 20 or the junction box JB, for example. The junction box JB is connected to a wire harness WH via a connector C, for example. An opening 42*h* for connecting the connector C may be formed in a support member 42. The wire harness WH connects the antenna 30 and a vehicle interior network. Accordingly, a signal for the wireless communication is transmitted between the antenna 30 and the vehicle interior network by wire.

The case 40 is a member housing the substrate 20 and the antenna 30. The case 40 includes the support member 42 and a cover 44.

The support member 42 is a member supporting the substrate 20. Herein, the support member 42 is formed into a plate-like shape. The support member 42 is formed in a curved state. The support member 42 has rigidity to the extent of being able to keep the curved state.

The support member 42 is provided on a lower side of the substrate 20 along a vertical direction. The substrate 20 is disposed on the support member 42, thus the support member 42 supports the substrate 20. The substrate 20 may be positioned and fixed to the support member 42. For example, the substrate 20 is attached to the support member 42 or locked thereto by a locking component to be positioned and fixed. When the substrate 20 is positioned and fixed to the support member 42, the substrate 20 may be provided on the lower side of the support member 42.

The cover 44 covers the substrate 20 supported by the support member 42 and the antenna 30. Herein, the cover 44 is formed into a box-like shape with an opening in a lower part. The opening of the cover 44 is covered by the support member 42.

Herein, the case 40 is attached to the roof panel 92. In the example illustrated in FIG. 3, the case 40 is fitted into a through hole 92*h* of the roof panel 92 from a side of the inner surface of the vehicle 80. The case 40 is provided with a flange 46. In the example illustrated in FIG. 3, the support member 42 is set to be larger than the cover 44, and an outer edge of the support member 42 constitute the flange 46. The flange 46 is fixed to the roof panel 92 by bolting, for example.

A member located on an outer side of the antenna 30 (the cover 44 herein) in the case 40 is formed of a material such as glass or resin which does not shield radio wave. A member located on an inner side of the antenna 30 (the support member 42 herein) in the case 40 may be formed of a material which does not shield radio wave or a material such as metal shielding radio wave. When the member located on the inner side of the antenna 30 in the case 40 is formed of the material which does not shield the radio wave, the member located on the inner side of the antenna 30 and the member located on the outer side thereof in the case 40 may be formed of the same material or materials different from each other.

A sealing part may be provided between the support member 42 and the cover 44. Accordingly, ingress of water, for example, from a space between the support member 42 and the cover 44 is suppressed. In the similar manner, a sealing part may be provided between the case 40 and the roof panel 92. Accordingly, ingress of water, for example, from a space between the case 40 and the roof panel 92 is suppressed. One sealing part may double as the sealing part between the support member 42 and the cover 44 and the sealing part between the case 40 and the roof panel 92. The sealing part between the support member 42 and the cover 44 and the sealing part between the case 40 and the roof panel 92 may be provided separately. The sealing part may be a lip part previously molded by a material such as rubber, or may also be formed of softened resin such as an adhesive agent filling a space and fixed therein.

In the antenna module 10, the substrate 20 is kept in the curved state. Herein, the substrate 20 is the flexible substrate 20, thus the substrate 20 itself hardly keeps the curved state. The substrate 20 is kept in the curved state by being supported by the support member 42.

The substrate 20 and the support member 42 are curved in the manner similar to the roof panel 92. Herein, the case 40 is also curved in the manner similar to the roof panel 92. An outer surface of the case 40 (an outer surface of the cover 44 in FIG. 3) is not concaved or does not protrude in an inward-outward direction with respect to the outer surface of the roof panel 92. That is to say, the outer surface of the case 40 (the outer surface of the cover 44 in FIG. 3) is flush with the outer surface of the roof panel 92. Needless to say, an outer surface of the case 40 (an outer surface of the cover 44 in FIG. 3) may be concaved or protrudes in the inward-outward direction with respect to the outer surface of the roof panel 92.

Herein, a curvature (curvature ratio) K (unit: 1/m) can be obtained by an expression of $K=1/R$ using a curvature radius (curvature ratio radius) R (unit: m). A ratio of curvature degree between the substrate 20 and the roof panel 92 is defined as a concordance rate I. The concordance rate I can be expressed by an expression of $1==K1/K2$ using a curvature K1 of the substrate 20 and a curvature K2 of the roof panel 92. A curvature in a peripheral edge part of the through hole 92*h* formed in the roof panel 92 can be used as the curvature K2 of the roof panel 92.

The curvatures K1 and K2 may be different from each other between a vehicle width direction (a right-left direction in a sheet of paper of FIG. 1) and a front-back direction (a right-left direction in a sheet of paper of FIG. 2). In this case, the curvatures K1 and K2 and the concordance rate I in the vehicle width direction are defined as curvatures K1*a* and K2*a* and a concordance rate Ia, respectively (wherein, $Ia=K1a/K2a$). The curvatures K1 and K2 and the concordance rate I in the front-back direction are defined as curvatures K1*b* and K2*b* and a concordance rate Ib, respectively (wherein, $Ib=K1b/K2b$).

Values of the concordance rates I, Ia, and Ib are not particularly limited, but can be appropriately set. For example, the values of the concordance rates I, Ia, and Ib may be equal to or larger than 0.5 and equal to or smaller than 1.5, equal to or larger than 0.7 and equal to or smaller than 1.3, or equal to or larger than 0.9 and equal to or smaller than 1.1. The values of the concordance rates Ia and Ib may the same as or different from each other. A tolerance range set for each of the values of the concordance rates Ia and Ib may be the same as or different from each other. For example, it is applicable that the value of the concordance rate Ia is equal to or larger than 0.5 and equal to or smaller than 1.5, and the value of the concordance rate Ib is equal to or larger than 0.7 and equal to or smaller than 1.3. When the substrate 20 is curved only in one of the vehicle width direction and the front-back direction, the tolerance range of the concordance rate I can be set only in a curved direction. Even in a case where the substrate 20 is curved in both the vehicle width direction and the front-back direction, the tolerance range of only one of the concordance rates Ia and Ib may be set. That is to say, the tolerance range of at least one of the concordance rates Ia and Ib may be set.

The substrate 20 is curved so that an outward surface is a convex surface. The plurality of antennas 30 are disposed in a planar positional relationship on the convex surface.

The plurality of antennas 30 include a first antenna 30A and a second antenna 30B. The first antenna 30A is the antenna 30 for first radio wave. The second antenna 30B is the antenna 30 for second radio wave. The second radio wave has a higher frequency band than the first radio wave. The second antenna 30B is provided in a position closer to a top part of the convex surface of the substrate 20 than the first antenna 30A. The top part indicates a part farthest away from a planar surface in normal line direction when the curved substrate 20 is disposed on the planar surface. The substrate 20 may be attached to the vehicle 80 in an inclined state. Thus, the top part is not necessarily located in a highest position in the substrate 20 in the vertical direction.

When the plurality of antennas 30 include three or more communication antennas 30 by frequency band different from each other, the first antenna 30A may be the communication antenna 30 by a lowest frequency band in the plurality of antennas 30, and the second antenna 30B may be the communication antenna 30 by a highest frequency band in the plurality of antennas 30.

When only one of a part extending in the width direction and a part extending in the front-back direction is curved in a part of the roof panel 92 to which the antenna module 10 is attached and the antenna module 10 is curved to correspond thereto, the top part may linearly extend in a direction in which the substrate 20 is not curved. Specifically, when the parts of the roof panel 92 and the antenna module 10 extending in the right-left direction in the sheet of paper as illustrated in FIG. 3 are curved, the top part extends in the front-back direction in the sheet of paper. In this case, the plurality of antennas 30 may be disposed in the top part side by side.

When the plurality of antennas 30 are disposed in the top part side by side, the antenna 30 by a lowest frequency band in the plurality of antennas 30 disposed in the top part may be provided in a position with a smallest distance from an edge of the substrate 20 in the plurality of antennas 30 disposed in the top part. The antenna 30 by a highest frequency band in the plurality of antennas 30 disposed in the top part may be provided in a position with a largest distance from the edge of the substrate 20 in the plurality of antennas 30 disposed in the top part. Accordingly, the antenna 30 by the highest frequency band can also perform favorable communication.

The antenna module 10 has a rectangular shape in a plan view. A longitudinal direction of the antenna module 10 is set to the vehicle width direction, and a short side direction thereof is set to the front-back direction. Needless to say, it is also applicable that the longitudinal direction of the antenna module 10 is set to the front-back direction, and the short side direction thereof is set to the vehicle width direction.

Effect Etc

According to the antenna module 10 having the above configuration, the substrate 20 is kept in the curved state. The antenna module 10 is attached to the roof 90, thus a protrusion dimension of the antenna module 10 protruding to the outer surface of the vehicle body can be reduced, and decrease in a living space in the vehicle caused by the antenna module 10 can be suppressed.

The substrate 20 is curved so that an outward surface is a convex surface. Thus, the roof trim 94 can also be formed into an outward-convex shape in accordance with the substrate 20. Accordingly, decrease in a living space in the vehicle can be suppressed.

Generally, radio wave has higher rectilineability and is less diffracted as a frequency increases. Even in this case, the second antenna 30B is provided in a position closer to the top part of the convex surface of the substrate 20 than the first antenna 30A. Thus, even if an obstacle to radio wave is located around the antenna module 10, interference from the obstacle to the second radio wave is relatively suppressed. Thus, the second antenna 30B can favorably perform communication.

The first radio wave has a lower frequency band than the second radio wave, thus is easily diffracted. Thus, even if an obstacle to radio wave is located around the antenna module 10, the first radio wave is diffractively propagated easily. Thus, the first antenna 30A can also favorably perform communication. A communication environment by radio wave in the antenna module 10 is improved.

The flexible substrate 20 is kept in the curved state by being supported by the support member 42, thus the substrate 20 can be kept in a curved shape easily.

The substrate 20 is kept in the curved state before the antenna module 10 is attached to the vehicle 80. Thus, when the antenna module 10 is attached to the vehicle 80, the substrate 20 is disposed in the curved state in the vehicle 80.

Modification Example

Figure 5:
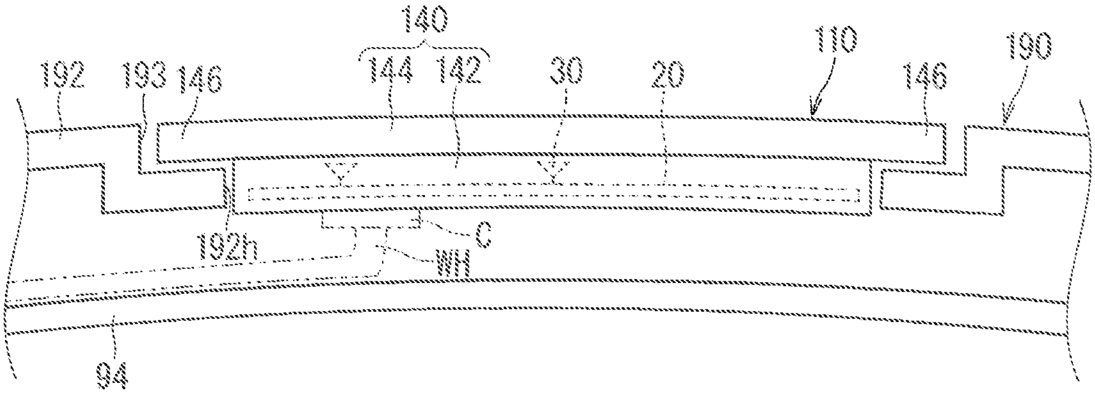
FIG. 5 is a schematic front view illustrating the antenna module according to a modification example and an attachment structure of attaching the antenna module to a roof.

FIG. 5 is a schematic front view illustrating an antenna module 110 according to a modification example and an attachment structure of attaching the antenna module 110 to a roof 190. The antenna module 110 according to the modification example is configured to be fitted into a through hole 192*h* of a roof panel 192 from a side of the outer surface of the vehicle 80.

A depression 193 is formed in the roof panel 192. A through hole 192*h* is formed in a bottom of the depression 193. An opening of the through hole 192*h* is smaller than an opening of the depression 193. A case 140 in the antenna module 110 includes a support member 142 and a cover 144. The support member 142 is formed into a box-like shape with an opening on an upper part. The substrate 20 and the antenna 30 are housed in the support member 142. The cover 144 is formed into a plate-like shape. The cover 144 covers an opening of the support member 142. The cover 144 is formed to be larger than the support member 142. An outer edge of the cover 144 constitutes a flange 146. The flange 146 has contact with a peripheral edge part of the through hole 192*h* in the bottom surface of the depression 193.

The shape of the case is not limited those described above. For example, both the support member and the cover may be formed in a box-like shape. At least one of the support member and the cover may be formed into a box-like shape with a flange.

In the description of the embodiment, the substrate 20 is the flexible substrate 20, however, this configuration is not necessary. The substrate may be a rigid substrate. In this case, the rigid substrate itself may be formed into a curved shape and have rigidity to the extent of being able to keep the curved shape. When the substrate is the rigid substrate, a support member may be or may not be provided.

In the description of the embodiment, the substrate 20 is curved so that so that the outward surface is the convex surface, however, this configuration is not necessary. The substrate may be curved so that the outward surface is a concave surface.

Each configuration described in the embodiment and each modification example can be appropriately combined as long as they are not contradictory.

EXPLANATION OF REFERENCE SIGNS

10, 110 antenna module
20 substrate
22 insulation body
24 print wiring
30 antenna
30A first antenna
30B second antenna
40, 140 case
42, 142 support member
44, 144 cover
46, 146 flange
80 vehicle
90, 190 roof
92, 192 roof panel
92*h*, 192*h* through hole
193 depression
94 roof trim
JB junction box
C connector
WH wire harness

The invention claimed is:

1. An antenna module attached to a roof in a vehicle, comprising:

a substrate;

a plurality of antennas provided on the substrate;

a case that houses the substrate and the plurality of antennas, wherein the roof is a member located over a living space in the vehicle, a roof panel in the roof is a member formed into a curved shape and having rigidity to an extent of being able to keep the curved shape, the substrate is kept in a curved state in a manner similar to the roof panel, the roof panel includes a through hole, the case is provided with a flange extending in a direction in which the roof panel extends, and the case is fitted into the through hole from a lower side of the roof panel such that an upper surface of the flange contacts a lower surface of the roof panel.

2. The antenna module according to claim 1, wherein the substrate is curved so that an outward surface is a convex surface.

3. The antenna module according to claim 2, wherein
the plurality of antennas include a first antenna for first radio wave and a second antenna for second radio wave having a higher frequency band than the first radio wave,
the first antenna and the second antenna are provided on the convex surface, and
the second antenna is provided in a position in the substrate closer to a top part of the convex surface than the first antenna.

4. The antenna module according to claim 1, wherein
the case includes a support member supporting the substrate and a box-shaped cover having an opening on a lower side and covering the substrate supported by the support member and the plurality of antennas from an upper side, the support member closing the opening of the cover from the lower side,
the support member is greater than the cover, and an outer edge of the support member constitutes the flange, and
the box-shaped cover of the case is fitted into the through hole from the lower side of the roof panel.

5. The antenna module according to claim 1, wherein the flange is fixed to the roof panel by bolting.

6. An antenna module attached to a roof in a vehicle, comprising:
a substrate;
a plurality of antennas provided on the substrate; and
a case that houses the substrate and the plurality of antennas, the case including a support member supporting the substrate, wherein
the roof is a member located over a living space in the vehicle,
the support member is formed into a curved shape, provided separately from a roof panel in the roof, and having rigidity to an extent of being able to keep the curved shape, and
the substrate is a flexible substrate, and supported by the support member, thereby being kept in a curved state in a manner similar to the roof panel,
the roof panel includes a through hole,
the support member is provided with a flange extending a direction in which the roof panel extends, and
the case is fitted into the through hole from a lower side of the roof panel such that an upper surface of the flange contacts a lower surface of the roof panel.

7. The antenna module according to claim 6, wherein
the case includes a box-shaped cover having an opening on a lower side and covering the substrate supported by the support member and the plurality of antennas from an upper side, the support member closing the opening of the cover from the lower side,
the support member is greater than the cover, and an outer edge of the support member constitutes the flange, and
the box-shaped cover of the case is fitted into the through hole from the lower side of the roof panel.

8. An antenna module attached to a roof in a vehicle, comprising:
a substrate;
a plurality of antennas provided on the substrate; and
a case that houses the substrate and the plurality of antennas, wherein
the roof is a member located over a living space in the vehicle,
a roof panel in the roof is a member formed into a curved shape and having rigidity to an extent of being able to keep the curved shape,
the substrate is kept in a curved state in a manner similar to the roof panel,
the roof panel includes a depression depressed downwardly toward the living space and a through hole provided in a bottom of the depression,
the case is provided with a flange extending in a direction in which the roof panel extends, and
the case is fitted into the through hole from an upper side of the roof panel such that a lower surface of the flange contacts an upper surface of the bottom of the depression at a peripheral edge part of the through hole.

9. The antenna module according to claim 8, wherein
the case includes a support member supporting the substrate,
the support member is formed into a curved shape, provided separately from the roof panel in the roof, and having rigidity to an extent of being able to keep the curved shape, and
the substrate is a flexible substrate, and supported by the support member, thereby being kept in a curved state in a manner similar to the roof panel.

10. The antenna module according to claim 8, wherein
the case includes a box-shaped support member supporting the substrate and having an opening on an upper side, and a cover that closes the opening of the support member from an upper side,
the cover is greater than the support member, and an outer edge of the cover constitutes the flange, and
the box-shaped support member of the case is fitted into the through hole from the upper side of the roof panel, and the cover is accommodated in the depression.

* * * * *